United States Patent [19]

Luckenbach

[11] 4,180,454
[45] Dec. 25, 1979

[54] METHOD FOR COMBUSTING CARBON MONOXIDE IN A FLUID CATALYTIC CRACKING PROCESS

[75] Inventor: Edward C. Luckenbach, Mountainside, N.J.

[73] Assignee: Exxon Research & Engineering Co., Florham Park, N.J.

[21] Appl. No.: 866,497

[22] Filed: Jan. 3, 1978

[51] Int. Cl.² .................... C10G 11/04; B01J 8/24; B01J 23/94
[52] U.S. Cl. .................... 208/113; 208/164; 252/417; 422/144; 422/223
[58] Field of Search .................... 208/113, 164; 252/412–418; 422/139, 144, 223

[56] References Cited

U.S. PATENT DOCUMENTS

| 2,589,124 | 3/1952 | Packie | 208/150 X |
|---|---|---|---|
| 3,206,393 | 9/1965 | Pohlenz | 208/164 |
| 3,410,793 | 11/1968 | Stranahan et al. | 208/159 |
| 3,909,392 | 9/1975 | Horecky et al. | 208/120 |
| 4,035,284 | 7/1977 | Gross et al. | 208/120 |
| 4,062,759 | 12/1977 | Castagnos et al. | 208/113 |

OTHER PUBLICATIONS

Conner & Bartholic, C.A. 80, 64276d, French 2,186,293, Concordance Germance Offen. No. 2,327,200.
Castagnos & Menzies, CA 80, 137569p (1974), Fr. 2,190,902, Concordance Ger. Offen. No. 2,190,902; Neth. Appl. 73/09759.

Primary Examiner—Delbert E. Gantz
Assistant Examiner—G. E. Schmitkons
Attorney, Agent, or Firm—John W. Ditsler; Edward H. Mazer

[57] ABSTRACT

A minor portion of the regeneration gas used to regenerate spent fluid catalytic cracking catalyst is passed into a distribution means located at the interface between the dense phase catalyst bed and the dilute catalyst phase in the regeneration zone of a fluid catalytic cracking process to combust, at said interface, the carbon monoxide formed in said bed to carbon dioxide. In a preferred embodiment, the level of the dense phase bed can be adjusted to vary the amount of catalyst entrained in the dilute catalyst phase such that the distribution means will be partially submerged. This serves to provide a simple and convenient method to absorb the heat released by the oxidation of carbon monoxide, thereby minimizing or eliminating excessive or undesirable afterburning in the dilute catalyst phase and in equipment downstream thereof.

7 Claims, 2 Drawing Figures

METHOD FOR COMBUSTING CARBON MONOXIDE IN A FLUID CATALYTIC CRACKING PROCESS

BACKGROUND OF THE INVENTION

1. Field of the Invention

The present invention relates to the regeneration of catalysts employed in a fluid catalytic cracking process. More particularly, this invention relates to combusting CO to $CO_2$ at the interface between the dense phase catalyst bed and the dilute catalyst phase by passing a minor portion of the regeneration gas through a distribution means located at said interface.

2. Description of the Prior Art

The fluidized catalytic cracking of hydrocarbons is well known in the prior art and may be accomplished in a variety of processes which employ fluidized solid techniques. Normally in such processes, suitably preheated, relatively high molecular weight hydrocarbon liquids and/or vapors are contacted with hot, finely divided, solid catalyst particles either in a fluidized bed reaction zone or in an elongated riser reaction zone, and maintained at an elevated temperature in a fluidized state for a period of time sufficient to effect the desired degree of cracking to lower molecular weight hydrocarbons typical of those present in motor gasolines and distillate fuels.

During the cracking reaction, coke is deposited on the catalyst particles in the reaction zone, thereby reducing the activity of the catalyst for cracking and the selectivity of the catalyst for producing gasoline blending stock. In order to restore a portion, preferably a major portion, of activity to the coke contaminated or spent catalyst, the catalyst is transferred from the reaction zone into a regeneration zone wherein the catalyst is contacted with an oxygen-containing regeneration gas, such as air, under conditions sufficient to burn at least a portion, preferably a substantial portion, of the coke from the catalyst. The regenerated catalyst is subsequently withdrawn from the regeneration zone and reintroduced into the reaction zone for reaction with additional hydrocarbon feed. Commonly, spent catalyst from the reaction zone is passed therefrom to a stripping zone for removal of strippable hydrocarbons from the catalyst particles prior to transferring the catalyst to the regeneration zone.

Typical regeneration zones in the prior art comprise large vertical cylindrical vessels wherein the spent catalyst is maintained as a fluidized bed by the upward passage of an oxygen-containing regeneration gas. The fluidized catalyst forms a dense phase catalyst bed in the lower portion of the vessel and a dilute catalyst phase containing entrained catalyst particles above, with an interface existing between the two phases. Flue gas, which normally comprises gases arising from the combustion of the coke on the spent catalyst, inert gases such as nitrogen from air, any unconverted oxygen and entrained catalyst particles, is then passed from the dilute catalyst phase into solid-gas separation means within the regeneration zone to prevent excessive losses of the entrained catalyst particles. The catalyst particles separated from the flue gas are returned to the dense phase catalyst bed. A substantially catalyst-free flue gas may then be passed from the separation means to equipment downstream thereof, for example to a plenum chamber, or be discharged directly from the top of the regeneration zone. Cyclone separators are commonly used as separation means.

The burning of coke deposits from the catalyst in the regeneration zone may be characterized in a simplified manner as the oxidation of carbon and represented by the following chemical equations:

$$C + O_2 \rightarrow CO_2 \tag{1}$$

$$2C + O_2 \rightarrow 2CO \tag{2}$$

$$2CO + O_2 \rightarrow 2CO_2 \tag{3}$$

Reactions (1) and (2) both occur under typical catalyst regeneration conditions wherein the catalyst temperatures may range from about 1050° to about 1300° F. and are exemplary of gas-solid chemical interactions when regenerating catalyst at temperatures within this range. The effect of any increase in temperature is reflected in an increased rate of combustion of carbon and a more complete removal of coke from the catalyst particles. Gas phase reaction (3) is also accelerated by increased temperature as well as higher pressure and, particularly, the amount of oxygen present. Somewhat lower temperatures may be employed where an added carbon monoxide combustion catalyst or promoter is employed. The promoter may be incorporated into the catalyst or introduced into the regeneration zone separately. In addition to the above reactions which relate to the formation of carbon monoxide and carbon dioxide from carbon, water is formed from hydrogen in the coke.

One difficulty which arises in regenerating catalyst is that as the coke is burned with oxygen, it tends to produce substantial amounts of carbon monoxide which is subject to further oxidation into carbon dioxide as represented by reaction (3) above, an exothermic reaction. The use of an amount of oxygen theoretically sufficient to burn coke in the fluidized catalyst bed to a desired low level of residual coke upon regenerated catalyst has had the frequent undesirable effect of evolving a combustible mixture of oxygen and carbon monoxide in the dilute catalyst phase which may undergo the further combustion commonly referred to as "afterburning". (See "Oil and Gas Journal", Vol. 53 (No. 3), pp. 93-94, 1955 for further discussion). The "afterburning" causes a substantial increase in the temperature of the dilute catalyst phase which may exceed about 1500° F. Such high temperatures in the dilute catalyst phase can cause deactivation of the catalyst, thereby requiring additional catalyst replacement to the process in order to maintain a desired catalytic activity in the hydrocarbon reaction zone. Additionally, these high temperatures may cause damage to mechanical components of the regeneration zone, particularly in that portion of the regeneration zone in contact with the substantially catalyst-free flue gas wherein the temperature may increase to 1800° F. or greater. Such excessive temperatures in the substantially catalyst-free flue gas occur when reaction (3) does not proceed at a sufficient rate in the dense bed phase and in the dilute catalyst phase such that said flue gas contains an excess of oxygen and carbon monoxide so as to cause afterburning to be initiated. Reaction (3) then proceeds rapidly within the substantially catalyst-free flue gas since there is very little entrained catalyst present to absorb the heat released, and thereby reduce the rise in temperature. Thus, in that portion of the regeneration zone wherein the flue gas is substantially catalyst-free, there will occur a rapidly accelerating rise in temperature due to the heat released as complete combustion of carbon monoxide occurs or as the available oxygen is utilized, in the absence of any means to moderate the temperature therein.

Several methods have been proposed to overcome undesirable afterburning in that portion of the regeneration zone containing the substantially catalyst-free flue gas. One method used in industry is to control the oxygen-containing gas stream entering the regeneration zone directly responsive to a predetermined temperature differential between the outlet of the dilute catalyst phase and the dense bed of the regeneration zone in order to minimize excess oxygen therein. This practice eliminates excessive temperatures in that portion of the regeneration zone in contact with the substantially catalyst-free flue gas and produces a small amount of oxygen in said flue gas, generally less than about 0.5 vol. %. However, this procedure has limited effect in attaining low levels of residual carbon on regenerated catalyst at conventional fluid catalytic cracker operating conditions wherein the dense phase bed temperature ranges from about 1050° to about 1250° F. and the amount of uncombusted carbon monoxide ranges from about 6–12 vol. %. (See, for example, U.S. Pat. No. 3,206,393.)

When catalyst regeneration is carried out to obtain a regenerated catalyst with low residual carbon content and a low carbon monoxide level in the flue gas, there have been, in general, three approaches suggested to overcome excessively high temperatures in the dilute catalyst phase. In one approach, a cooling medium which may comprise steam, liquid water, unregenerated catalyst, hydrocarbon oil, flue gas, etc. is injected to cool the dilute catalyst phase below a temperature which will cause damage to the catalyst or to mechanical members of the regeneration zone (see, for example, U.S. Pat. Nos. 2,393,839, 2,454,373 and 2,580,827). Another approach is to employ series catalyst regeneration wherein the catalyst to be regenerated is contacted in a plurality of dense phase regeneration zones with an oxygen-containing regeneration gas in which the catalyst flows from zone to zone, the temperature in each zone not exceeding a temperature at which excessive afterburning will occur. (See, for example, U.S. Pat. Nos. 2,788,311, 3,494,858, and 3,563,911.) The third approach involves the use of indirect heat exchange, such as steam generation coils in the dense phase bed. When such methods are employed in conventional fluid catalytic cracker operations, the amount of carbon monoxide present in the flue gas may still be substantial, generally being in the range of from 6–12 vol. %. In addition, the above methods result in the loss of recoverable heat from the process or require expenditures for the use of additional equipment.

More recently, it has been suggested to reduce the levels of both residual carbon on regenerated catalyst and emissions of carbon monoxide by operating the dense phase bed in the regeneration zone at elevated temperatures, that is, temperatures ranging from about 1250° to about 1400° F. These high dense phase bed temperatures can result in substantial afterburning in the dilute catalyst phase and may be prevented by techniques similar to and having the same disadvantages as those mentioned above. As an example, U.S. Pat. No. 3,909,392 discloses a two-stage process for regenerating fluid catalytic cracking catalysts at elevated temperatures, thereby favoring substantially complete combustion of carbon monoxide, with a provision for recovering the heat evolved in the dilute catalyst phase by the use of a circulating stream of partially regenerated catalyst.

As another example, U.S. Pat. Nos. 3,844,973, 3,919,115 and 3,923,686 disclose a regeneration zone which comprises a first dense bed, a dilute phase transport riser, and a second dense bed. The carbonaceous deposits are oxidized in the first dense bed to produce a partially spent regeneration gas containing carbon monoxide and a regenerated catalyst. The regeneration gas and regenerated catalyst are then passed to a dilute phase transport riser wherein, preferably, carbon monoxide is combusted to carbon dioxide, with the regenerated catalyst being passed to the second dense bed from which it is returned to the reaction zone. Thus, the oxidation of both carbon monoxide and coke occur within the same regeneration zone but, preferably, at different locations. These references disclose control of the temperature of the regenerated catalyst returning to the reaction zone independently of the coke oxidation and as another variation, control of the coke on spent catalyst to a predetermined residual level by adjusting the regeneration gas rate to the first dense bed.

Also, some published foreign patent applications making claim to priority applications filed in the U.S. suggest controlling the oxidation of carbon monoxide to carbon dioxide in the dense bed phase by regulating the oxygen rates passing into the regeneration zone in order to reduce the level of coke on regenerated catalyst leaving the regeneration zone and to minimize, if not totally eliminate, afterburning occuring within the regeneration zone. (See, for example, German application No. 2,327,209 and Netherlands application No. 73,09759.) However, for a commercially operating fluid catalytic cracking unit, any appreciable increase in regeneration gas rate might require additional blower or compressor capacity, thereby necessitating an added expenditure. In addition, although the low residual carbon on regenerated catalyst and the low carbon monoxide level in the flue gas can be maintained by adjusting the regeneration gas rate and hence the oxygen concentration in the regeneration zone, this method has the disadvantage of involving the interaction of several process variables. For example, changes in the regeneration gas rate, while maintaining the excess oxygen in the regeneration zone at a constant level, will result in a directly proportional heat release in said zone. The differential heat evolved will cause a change in the dense phase bed temperature which in turn must be compensated for by adjusting the catalyst circulation rate. This changes the temperature in the reaction zone which in turn causes a variation in the coke make which requires complicated secondary corrective measures.

Thus, in view of the disadvantages of the methods employed in the foregoing prior art, it would appear desirable to have available a simple and convenient technique for reducing the carbon monoxide content in the flue gas to desirable low levels to minimize or eliminate excessive afterburning, particularly in that portion of the regeneration zone occupied by substantially catalyst-free flue gas.

SUMMARY OF THE INVENTION

Now according to the present invention, it has been discovered that excessive or undesirable afterburning in the dilute catalyst phase and in downstream equipment thereof can be reduced or substantially eliminated by passing a minor portion of the regeneration gas into a distribution means located at the interface between the dense phase catalyst bed and the dilute catalyst phase. This serves to combust, at the interface, the carbon monoxide formed in said dense phase bed and released therefrom into the dilute catalyst phase. In a preferred embodiment, the level of the dense phase bed is adjusted such that the distribution means will be partially submerged during said combustion. This enables satisfactory temperature control by providing additional entrained catalyst from the dense phase bed to absorb the heat released during oxidation of the carbon monoxide.

DETAILED DESCRIPTION OF THE INVENTION

Figure 1:
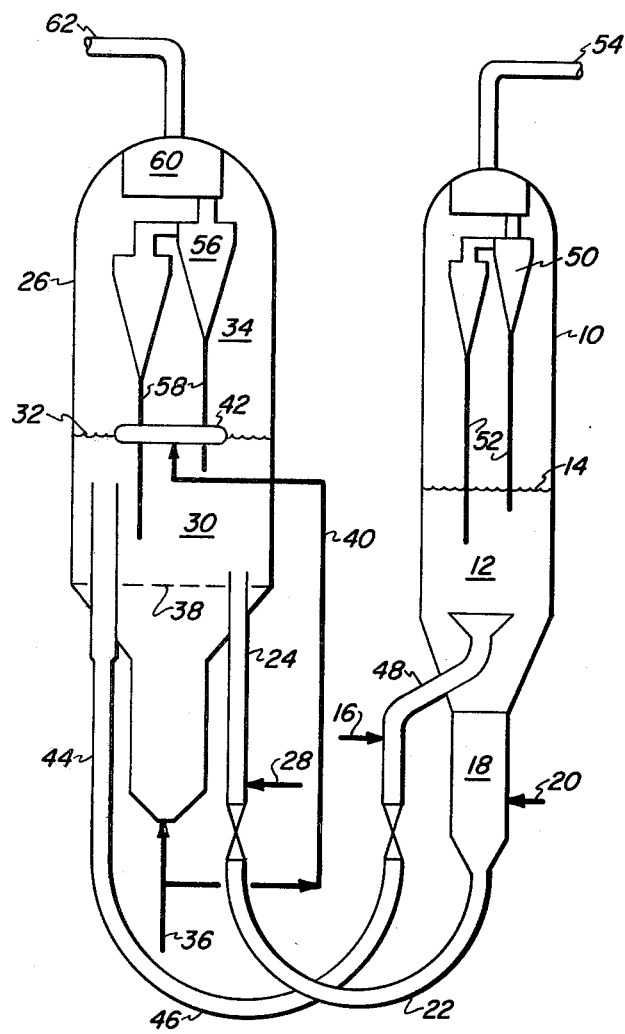
FIG. 1 is a flow diagram of the present invention as applied to a fluid catalytic cracking process.

Having thus described the invention in general terms, reference is now made to FIG. 1, which illustrates how the present invention may be applied to a typical fluid catalytic cracking process. Such details are included as are necessary for a clear understanding of how the present invention may be applied to said system. No intention is made to unduly limit the scope of the present invention to the particular configuration shown as other configurations are contemplated. Various items such as valves, pumps, compressors, steam lines, instrumentation and other process equipment and control means have been omitted therefrom for the sake of simplicity. Variations obvious to those having ordinary skill in the art of catalyst regeneration processes are included within the broad scope of the present invention.

Referring now to FIG. 1, there is shown a vertically arranged cylindrical reaction zone 10 containing a fluidized bed 12 of catalyst having a level indicated at 14, in which a hydrocarbon feedstock introduced at line 16 is undergoing catalytic cracking. Hydrocarbon feedstocks that can be suitably employed in a fluid catalytic cracking process include naphthas, light gas oils, heavy gas oils, wide-cut gas oils, vacuum gas oils, kerosenes, decanted oils, residual fractions, reduced crude oils, cycle oils derived from any of these, as well as suitable fractions derived from shale oil kerogen, tar sands bitumen processing, synthetic oils, coal hydrogenation, and the like. Such feedstocks may be employed singly, separately in parallel reaction zones, or in any desired combination. Hydrocarbon gas and vapors passing through fluid bed 12 maintain the bed in a dense turbulent fluidized condition having the appearance of a boiling liquid.

In reaction zone 10, the cracking catalyst becomes spent during contact with the hydrocarbon feedstock due to the deposition of coke thereon. Thus, the terms "spent" or "coke-contaminated" catalyst as used herein generally refer to catalyst which has passed through a reaction zone and which contains a sufficient quantity of coke thereon to cause activity loss, thereby requiring regeneration. Generally, the coke content of spent catalyst can vary anywhere from about 0.5 to about 5 wt. % or more. Typically, spent catalyst coke contents vary from about 0.5 to about 1.5 wt. %.

Prior to actual regeneration, the spent catalyst is usually passed from the reaction zone into a stripping zone 18 and contacted therein with a stripping gas, which is introduced into the lower portion of zone 18 via line 20. The stripping gas, which is usually introduced at a pressure of from about 10 to about 50 psig, serves to remove most of the volatile hydrocarbons from the spent catalyst. A preferred stripping gas is steam, although nitrogen, other inert gases or flue gas may be employed. Normally, the stripping zone is maintained at essentially the same temperature as the reaction zone, i.e. from about 850° to about 1100° F.

Stripped spent catalyst from which most of the volatile hydrocarbons have been stripped therefrom is then passed from the bottom of stripping zone 18, through U-bend 22 and into a connecting vertical riser 24 which extends into the lower portion of a regeneration zone 26. Air is added to riser 24 via line 28 in an amount sufficient to reduce the density of the catalyst flowing therein, thus causing the catalyst to flow upward into the regeneration zone 26 by simple hydraulic balance.

In the particular configurations shown in FIG. 1, the regeneration zone is a separate vessel (arranged at approximately the same level as reaction zone 10) containing a dense phase catalyst bed 30 having a level indicated at 32, which is undergoing regeneration to burn off coke deposits formed in the reaction zone during the cracking reaction, above which is a dilute catalyst phase 34. An oxygen-containing regeneration gas enters the lower portion of regeneration zone 26 via line 36 and passes up through a grid 38 and the dense phase catalyst bed 30, maintaining it in a turbulent fluidized condition similar to that present in reaction zone 10. As will be discussed in more detail hereinbelow, the present invention resides in passing a minor portion of said regeneration gas via line 40 into a distribution means 42 (e.g., a distribution ring) located at the interface between the dense phase bed 30 and the dilute catalyst phase 34 so as to combust the carbon monoxide formed in said bed as it passes therefrom into the dilute catalyst phase.

Oxygen-containing regeneration gases which may be employed in the process of the present invention include those gases which contain molecular oxygen in admixture with a substantial portion of an inert diluent gas. Air is a particularly suitable regeneration gas. An additional gas which may be employed is air enriched with oxygen. Additionally, if desired, steam may be added to the dense phase bed along with the regeneration gas or separately therefrom to provide additional inert diluents and/or fluidization gas. Typically, the specific vapor velocity of the regeneration gas will be in the range of from about 0.8 to about 6.0 feet/sec, preferably from about 1.5 to about 4 feet/sec.

Regenerated catalyst from the dense phase catalyst bed 30 in the regeneration zone 26 flows downward through standpipe 44 and passes through U-bend 46 into the reaction zone 10 by way of the transfer line 48, which joins U-bend 46 at the level of the oil injection line 16 above the U-bend. By regenerated catalyst is meant catalyst leaving the regeneration zone which has contacted an oxygen-containing gas causing at least a portion, preferably a substantial portion, of the coke present on the catalyst to be removed. More specifically, the carbon content of the regenerated catalyst can vary anywhere from about 0.01 to about 0.2 wt. %, but preferably is from about 0.01 to about 0.1.

The hydrocarbon feedstock for the cracking process is injected into line 48 through line 16 to form an oil and catalyst mixture which is passed into the fluid bed 12 within the reaction zone 10. Product vapors containing entrained catalyst particles pass overhead from fluid bed 12 into a gas-solid separating means 50 wherein the entrained catalyst particles are separated therefrom and returned through diplegs 52 leading back into fluid bed 12. The product vapors are then conveyed through line 54 into the product recovery system.

In regeneration zone 26, flue gases formed during regeneration of the spent catalyst pass from the dense phase catalyst bed 30 into the dilute catalyst phase 34 along with entrained catalyst particles. The catalyst particles are separated from the flue gas by a suitable gas-solid separation means 56 and returned to the dense phase catalyst bed 30 via diplegs 58. The substantially catalyst-free flue gas then passes into a plenum chamber 60 prior to discharge from the regeneration zone 26 through line 62. Typically, the flue gas will contain less than about 0.2, preferably less than 0.1, and more preferably less than 0.05 volume % carbon monoxide. Typically, the oxygen content will vary from about 0.4 to about 7 vol. %, preferably from about 0.8 to about 5 vol. %, and more preferably from about 1 to about 3 vol. %.

As noted previously, the carbon monoxide is formed in the dense phase bed as the coke on the spent catalyst is contacted with oxygen. The carbon monoxide thus formed may then pass into the dilute catalyst phase where it is further oxidized to carbon dioxide according to reaction (3). This could result in undesirable or excessive afterburning in the dilute catalyst phase or in equipment downstream thereof. By the expression "excessive" or "undesirable" afterburning is meant obtaining temperatures in the substantially catalyst-free flue gas system due to the combustion of carbon monoxide that exceed permissible catalyst deactivation, materials of construction limitations and the like. In general, undesirable or excessive afterburning corresponds to temperatures above 1450° F. Preferably, however, the temperature should be maintained below about 1420° F., more preferably below about 1400° F., to avoid the undesirable effects of excessive afterburning.

However, the problems associated with undesirable or excessive afterburning can be virtually eliminated by combusting the carbon monoxide prior to its passing into a region of the regeneration zone that is depleted in catalyst. This may be accomplished simply and conveniently by providing a minor portion of the regeneration gas to a gas distribution means (e.g., a distribution ring) located at the interface between the dense phase catalyst bed and the dilute catalyst phase. As the carbon monoxide passes from the dense phase bed, it will react with the oxygen in the regeneration gas introduced through said distribution means to form carbon dioxide. The amount of regeneration gas passed to the interfacial distribution means is not critical and can vary with various process and economic factors. However, there should be an amount sufficient to oxidize the carbon monoxide passing from the dense phase bed. Typically, this will correspond to from about 15 to less than 50%, preferably from about 20 to about 40%, of the regeneration gas normally employed.

Figure 2:
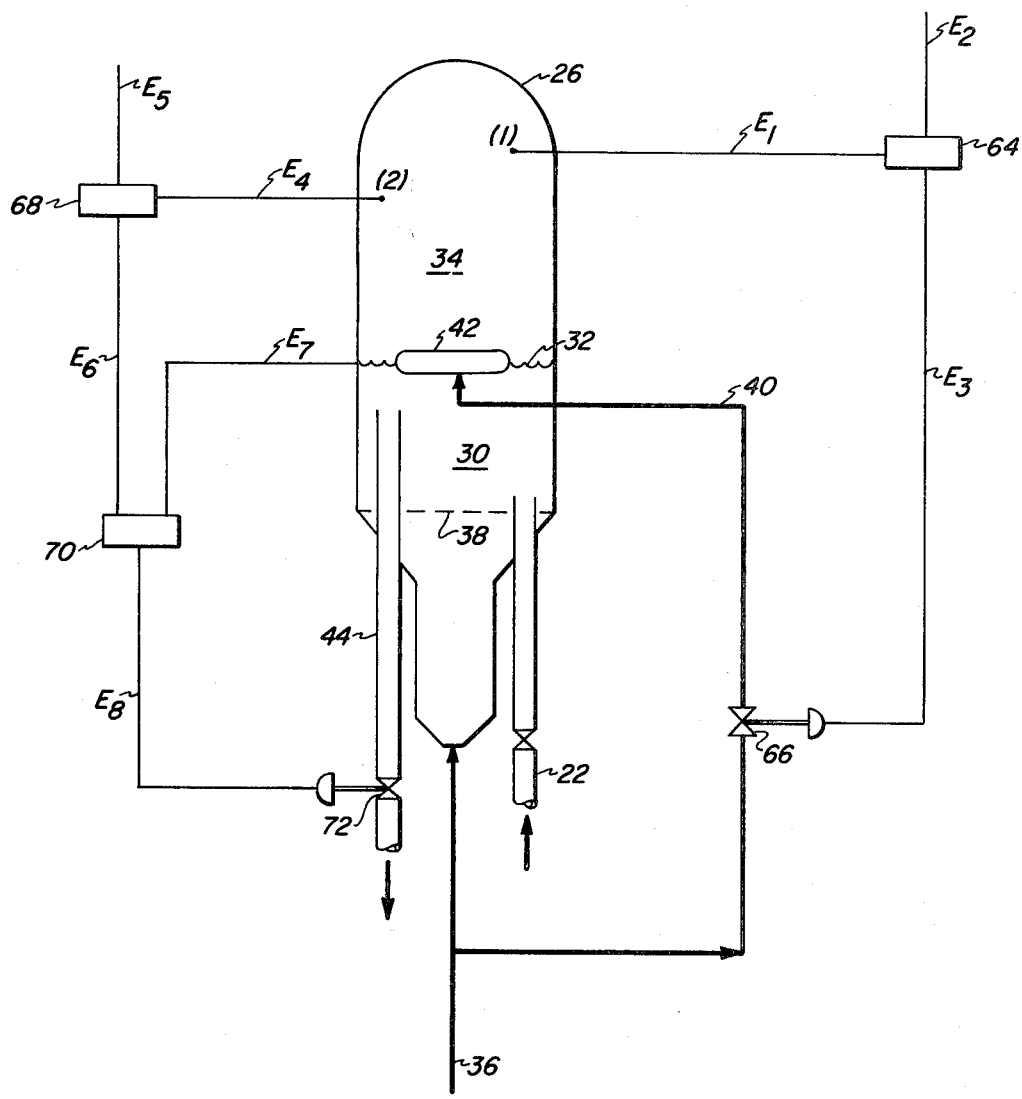
FIG. 2 shows a more detailed view of the present invention.

A better understanding of how the present invention may be applied to reducing and/or minimizing excessive or undesirable afterburning may be obtained by reference to FIG. 2 which shows spent catalyst from a stripping zone (not shown) being introduced into the dense phase catalyst bed 30 of regeneration zone 26 via line 22. Also shown is a regeneration gas in line 36 passing up through grid 38 and into bed 30 where it reacts with the carbon on the spent catalyst forming carbon monoxide. From about 50 to about 85%, preferably from about 60 to about 80%, of the total regeneration gas is passed through grid 38 such that the ratio of CO to $CO_2$ leaving the dense phase bed will be about 1:1, as is typically encountered in regeneration zones operating at bed temperatures between, say, 1200° to 1250° F. The remaining portion of the regeneration gas will be passed into the distribution means 42 located near the top of the dense phase bed such that the heat released during carbon monoxide oxidation will be released into the dilute catalyst phase.

The amount of regeneration gas passed into distribution means 42 can be regulated by sensing or detecting, for example, an oxygen concentration at some convenient location, say point (1) in the dilute catalyst phase. The inlet or outlet of the separation means as well as the flue gas in line 62 could also be suitable locations for sensing said oxygen concentration. A signal $E_1$, corresponding to the sensed concentration, could then be developed and passed into a comparison means 64 which compares signal $E_1$ with a signal $E_2$ corresponding to the desired oxygen concentration at the point being monitored such that a control signal $E_3$ is generated. The control signal $E_3$ is then applied to a control means 66 which regulates the amount of regeneration gas introduced into distribution means 42 via line 40. Thus, in this particular embodiment, as would be obvious to one skilled in the art, the amount of regeneration gas employed in line 40 will vary with the oxygen concentration at some specified location. However, it should be understood that the amount of regeneration gas used in line 40 could, alternatively, be regulated according to other variables such as CO concentration, etc.

In a preferred embodiment, the level of the dense phase bed is varied to control catalyst entrainment in the dilute catalyst phase which, in turn, serves to control dilute phase temperature. As shown in FIG. 2, this may be accomplished, for example, by detecting or sensing the temperature at some convenient location (say point (2) in the dilute catalyst phase). A temperature difference between two points could also be suitably employed. A signal $E_4$ corresponding to the sensed condition could then be developed and passed into another comparison means 68 which compares signal $E_4$ with a signal $E_5$ corresponding to the desired temperature at point (2) such that a control signal $E_6$ is generated. The level of dense phase catalyst bed is also sensed and a signal $E_7$ corresponding to said sensed level is developed. The signals $E_6$ and $E_7$ are then passed into yet another comparison means 70 such that a control signal $E_8$ is generated. The control signal $E_8$ is then applied to a control means 72 which regulates the regenerated catalyst withdrawal from regeneration zone 26 and, hence, the level 32 of the dense phase bed. For example, if the temperature sensed by signal $E_4$ is greater than the set point temperature provided by signal $E_5$, control signal $E_6$ indicates that the level of the dense phase bed must be changed (in fact, be increased to provide more catalyst entrainment in the dilute catalyst phase so as to absorb more of the heat released from combustion of the carbon monoxide). Thus, signal $E_6$ provides a set point for the control of the dense phase bed level 32. Based upon the information provided by signals $E_6$ and $E_7$, control signal $E_8$ causes control means 72 (e.g., a slide valve) to reduce the flow of regenerated catalyst from the regeneration zone via line 44 such that the level 32 is raised, thus increasing the amount of catalyst in the dilute catalyst phase. Other means may be used to vary the level in the regenerator such as adding to or withdrawing catalyst from the unit.

Thus, by use of the present invention, the temperature in the dilute catalyst phase or in the equipment downstream thereof can be controlled effectively such that undesirable or excessive afterburning can be minimized or substantially eliminated. In addition, very low levels of carbon monoxide can be obtained in the flue gas, both benefits being obtained regardless (i.e., independent) of the temperature of the dense phase catalyst bed.

It should be noted that the temperature or oxygen concentration detecting or sensing means, the comparison means and the control means do not, per se, form a part of the present invention. Such devices would be well known to one skilled in the art and may be obtained from a number of reliable vendors.

In general, any commercial catalytic cracking catalyst designed for high thermal stability could be suitably employed in the present invention. Such catalysts include those containing silica and/or alumina. Other refractory metal oxides such as magnesia or zirconia may be employed and are limited only by their ability to be effectively regenerated under the selected conditions. With particular regard to catalytic cracking, preferred catalysts include the combinations of silica and alumina, containing 10 to 50 wt. % alumina, and particularly their admixtures with molecular sieves or crystalline aluminosilicates. Suitable molecular sieves include both naturally occurring and synthetic aluminosilicate materials, such as faujasite, chabizite, X-type and Y-type aluminosilicate materials and ultra stable, large pore crystalline aluminosilicate materials. When admixed with, for example, silica-alumina to provide a petroleum cracking catalyst, the molecular sieve content of the fresh finish catalyst particles is suitably within the range from 5-15 wt. %, preferably 8-10 wt. %. An equilibrium molecular sieve cracking catalyst may contain as little as about 1 wt. % crystalline material. Admixtures of clay-extended aluminas may also be employed. Such catalysts may be prepared in any suitable method such as by impregnation, milling, co-gelling, and the like, subject only to provision of the finished catalyst in a physical form capable of fluidization.

As noted previously, the regeneration zone employed in the present invention normally comprises vertical cylindrical vessels wherein the catalyst to be regenerated is maintained as fluidized bed by the upward passage of an oxygen-containing regeneration gas thereby forming a dense phase catalyst bed and a dilute catalyst phase with an interface in between. The dense phase bed, which is usually located in the lower portion of the regeneration zone, is maintained at a temperature in the range of from about 1150°–1350° F., preferably from about 1200°–1300° F. The density of the dense phase bed may range from about 8 to about 30 lb/cu. ft.

The dilute catalyst phase is the primarily gaseous phase volume located above the dense phase bed within the regeneration zone. Specifically, the dilute phase contains relatively small quantities of catalyst compared to the dense phase bed. For example, the density of the dilute phase zone ranges from about 0.1 to about 1.0 lb/cu. ft. at the inlet to the separation means and from about 1 to about 5 lb/cu. ft. near the interface between the dense bed phase and the dilute catalyst phase. In many instances, the overall flow in the dilute phase is a concurrent flow of catalyst entrained with flue gases. It is contemplated that the dilute catalyst phase can include substantial quantities of the dense bed material which passes into that phase from excessive agitation or bubbling of gaseous materials through the dense bed. In general, the temperature in the dilute catalyst phase is at least that in the dense bed phase and is advantageously maintained within the range from about 1200° to about 1450° F., preferably from about 1300° to about 1400° F.

The term "substantially catalyst-free flue gas" is the gaseous phase volume located within or downstream of the catalyst separation means within the regeneration zone. Specifically, the "substantially catalyst-free flue gas" comprises flue gas from the dilute catalyst phase from which entrained catalyst particles have been substantially removed. This corresponds to the gaseous effluent from the separation means within the regeneration zone wherein the concentration of entrained catalyst particles will be less than about 1, preferably less than about 0.2, grains per actual cubic foot. The term "actual cubic foot" refers to the volume measured at actual operating conditions without correction to a standard temperature and pressure. The substantially catalyst-free flue gas from the separation means may be discharged to a variety of downstream equipment such as a dispersion means to redistribute the flue gas, stack valves, a plenum chamber and the like, prior to leaving the regeneration zone. By the use of the method of the present invention, substantial afterburning, and hence excessive temperatures in that portion of the regeneration zone wherein the flue gas is substantially catalyst-free, may be avoided. Preferably, the temperature in that portion of said regeneration zone is maintained at least equal to that of the dilute catalyst phase at the inlet to the separation devices but no more than 50° F., preferably no more than 30° F., and most preferably no more than 20° F., above that at said inlet. Although not necessary to the practice of the present invention, extraneous cooling means such as steam may be employed to further reduce the temperature and thereby inhibit the afterburning reaction in that portion of the regeneration zone wherein the flue gas is substantially catalyst-free.

One or more gas-solids separation means may be utilized in the dilute catalyst phase to separate entrained regenerated catalyst particles from the regeneration gas. Preferred separation means will be cyclone separators, multiclones or the like whose design and construction are well known in the art. In the case of cyclone separators, a single cyclone may be used, but preferably more than one cyclone will be used in parallel or in series flow to effect the desired degree of separation.

The construction of the regeneration zone can be made with any material sufficiently able to withstand the relatively high temperatures involved when afterburning is encountered within the vessel and the high attrition conditions which are inherent in systems wherein fluidized catalyst is regenerated and transported. Specifically, metals are contemplated which may or may not be lined. More specifically, ceramic liners are contemplated within any and all portions of the regeneration zone together with alloy use and structural designs in order to withstand temperatures of about 1400° F. and, for reasonably short periods of time, temperatures which may be as high as 1800° F.

The pressure in the regeneration zone is usually maintained in a range from about atmospheric to about 50 psig, preferably from about 10 to 50 psig. It is preferred, however, the design the regeneration zone to withstand pressures of up to about 100 psig. Operation of the regeneration zone at increased pressure has the effect of promoting the conversion of carbon monoxide to carbon dioxide and reducing the temperature level within the dense bed phase at which the substantially complete combustion of carbon monoxide can be accomplished. The higher pressure also lowers the equilibrium level of carbon on regenerated catalyst at a given regeneration temperature.

The residence time of the spent catalyst in the regeneration zone is not critical. In general, it can vary from about 1 to about 6 minutes. Typically it can vary from about 2 to about 4 minutes. The contact time or residence time of the flue gas in the dilute catalyst phase establishes the extent to which the combustion reaction can reach equilibrium. The residence time of the flue gas may vary from about 10 to about 60 seconds in the regeneration zone and from about 2 to about 15 seconds in the dense bed phase. Preferably, the residence time of the flue gas varies from about 15 to about 20 seconds in the regeneration zone and from about 6 to about 10 seconds in the dense bed.

The present invention may be applied beneficially to any type of fluid cat cracking unit with little or no modifications and without limitations as to the spatial arrangement of the reaction, stripping, and regeneration zones thereof. The regeneration zone of a catalytic cracking unit can be designed independently from the reaction zone since the regeneration zone merely receives spent catalyst, oxidizes the coke thereon to regenerate the catalyst, and returns the regenerated catalyst to the reaction zone. Therefore, the reaction zone can be a pure transfer line, i.e., one in which the reaction occurs in a single pipe type vessel directly terminating in a rough cut cyclone or cyclones, a conventional dilute riser/dense bed combination, or a dense bed alone.

What is claimed is:

1. In a fluidized catalytic cracking process which comprises contacting a hydrocarbon feedstock with a cracking catalyst in a reaction zone under cracking conditions to produce cracked hydrocarbon vapors and coke contaminated catalyst, wherein said coke contaminated catalyst is regenerated in a regeneration zone under regeneration conditions by contact with an oxygen-containing regeneration gas thereby forming a regenerated catalyst and a flue gas containing carbon monoxide, the catalyst in the regeneration zone being fluidized by the upward flow of said regeneration gas to form a dense phase catalyst bed and a dilute catalyst phase which are separated by an interface, the improvement which comprises passing a portion of said regeneration gas into a gas distribution means located at about the interface between said dense phase catalyst bed and said dilute catalyst phase to thereby combust at about the interface at least a portion of the carbon monoxide in said flue gas.

2. The process of claim 1 wherein a major portion of said regeneration gas is used to fluidize the catalyst in said regeneration zone, the remaining portion of said regeneration gas being used to combust the carbon monoxide at said interface.

3. The process of claim 2 wherein said remaining portion ranges from about 15 to about 40% of said regeneration gas rate.

4. The process of claim 1 wherein the carbon monoxide content of the flue gas after said combustion is less than 0.05 volume %.

5. The process of claim 1 wherein said regeneration gas comprises air.

6. The process of claim 1 wherein said gas distribution means is partially submerged in said dense phase catalyst bed to thereby permit said dense phase catalyst bed to absorb at least a portion of the heat released during oxidation of the carbon monoxide.

7. The process of claim 6 wherein said gas distribution means is a distribution ring.